United States Patent
Boyle

(10) Patent No.: US 9,267,559 B2
(45) Date of Patent: Feb. 23, 2016

(54) DAMPENING CLIP

(71) Applicant: Akebono Brake Corporation, Farmington Hills, MI (US)

(72) Inventor: Brian Lewis Boyle, Farmington Hills, MI (US)

(73) Assignee: AKEBONO BRAKE INDUSTRY CO., LTD, Tokyo (JP)

( * ) Notice: Subject to any disclaimer, the term of this patent is extended or adjusted under 35 U.S.C. 154(b) by 108 days.

(21) Appl. No.: 14/036,624

(22) Filed: Sep. 25, 2013

(65) Prior Publication Data

US 2015/0083530 A1    Mar. 26, 2015

(51) Int. Cl.
| | |
|---|---|
| *F16D 65/40* | (2006.01) |
| *F16D 65/00* | (2006.01) |
| *F16D 65/097* | (2006.01) |
| *F16D 65/38* | (2006.01) |
| *F16D 55/00* | (2006.01) |

(52) U.S. Cl.
CPC ........ F16D 65/0006 (2013.01); F16D 65/0978 (2013.01); *F16D 2055/0008* (2013.01)

(58) Field of Classification Search
CPC ... F16D 65/00; F16D 65/0006; F16D 65/005; F16D 2055/0004; F16D 2055/0008; F16D 13/58; F16D 65/0978
USPC ................. 188/73.36, 73.37, 73.38
See application file for complete search history.

(56) References Cited

U.S. PATENT DOCUMENTS

| | | | | |
|---|---|---|---|---|
| 5,320,200 | A | * | 6/1994 | Hashimoto ............... 188/250 E |
| 5,377,790 | A | | 1/1995 | Tsuruta |
| 5,416,962 | A | | 5/1995 | Passarella |
| 5,901,815 | A | * | 5/1999 | Kobayashi et al. ............... 188/7 |
| D483,709 | S | | 12/2003 | Byrd |
| D489,655 | S | | 5/2004 | Byrd |
| 7,086,506 | B2 | | 8/2006 | Wemple et al. |
| 7,219,773 | B2 | * | 5/2007 | Ono ........................... 188/73.38 |
| 8,397,880 | B2 | * | 3/2013 | Chelaidite .................. 188/73.38 |
| 8,439,171 | B2 | * | 5/2013 | Kaneko et al. ............. 188/73.38 |
| 2005/0236236 | A1 | * | 10/2005 | Farooq ........................ 188/73.31 |
| 2006/0289250 | A1 | | 12/2006 | Dobrusky et al. |
| 2006/0289255 | A1 | | 12/2006 | Adams |
| 2010/0147635 | A1 | * | 6/2010 | Hayashi ..................... 188/73.38 |
| 2012/0152667 | A1 | | 6/2012 | Bosco, Jr. |
| 2013/0025981 | A1 | * | 1/2013 | Maehara et al. ............. 188/72.3 |

FOREIGN PATENT DOCUMENTS

EP    0282129    9/1988

* cited by examiner

*Primary Examiner* — Melody Burch
(74) *Attorney, Agent, or Firm* — The Dobrusin Law Firm, P.C.

(57) ABSTRACT

A dampening clip comprising: a body portion and a connecting portion extending from the body portion, the connecting portion being configured to connect the dampening clip to an adjacent component, and wherein the dampening clip includes a portion made of a supporting material and a portion made of a dampening material.

19 Claims, 11 Drawing Sheets

DAMPENING CLIP

FIELD

The present teachings generally relates to a dampening clip for use with brake pads and more specifically a pad dip including a dampening dip to reduce noise, vibration, harshness (NVH), or a combination thereof.

BACKGROUND

Typical disc brake systems include a support bracket, one or more brake pads, a caliper, and a rotor. The one or more brake pads are mounted and located in the support bracket so that the brake pads slide axially towards and away from the rotor. The disc brake system may include a pad clip that attaches to the support bracket and to a portion of the one or more brake pads so that the brake pads are held in the support bracket. During a brake apply a piston in the caliper presses on one of the brake pads moving the brake pad along the support bracket and into contact with the rotor, and once in contact with the rotor, fingers connected on an opposing side of the rotor move the opposing brake pad into contact with the opposing side of the rotor so that a brake apply is created. During running the brake pads may be substantially free of contact with the piston, the fingers, or both and movement and/or vibrations of the brake assembly may cause the brake pads and/or pad clip to move and contact the support bracket resulting in noise, vibrations, or harshness (NVH) that may be heard and/or felt by a user. It would be attractive to have a device that reduces brake noise during running, a brake apply, a brake retract, or a combination thereof. It would be attractive to have a device that minimizes movement of the brake pads and/or pad clips relative to the support bracket. What is needed is a device that dampens vibrations between the brake pads and the pad clips, the pad clips and the support brackets, or both.

Examples of brake clips are disclosed in U.S. Pat. Nos. D483,709S; D489,655; 5,377,790; and 7,086,506 and some examples of dampeners are disclosed in U.S. Pat. No. 5,416,962 and U.S. Patent Application Publication Nos. 2006/0289250; 2006/0289255; and 2012/0152667; and European Patent Application No. EP0282129A1, all of which are expressly incorporated by reference herein for all purposes.

SUMMARY

One possible embodiment of the present teachings includes: dampening clip comprising: a body portion and a connecting portion extending from the body portion, the connecting portion being configured to connect the dampening dip to an adjacent component, and wherein the dampening clip includes a portion made of a supporting material and a portion made of a dampening material.

One unique aspect of the present teachings envisions a pad clip comprising one or more of the dampening clips of the teachings herein, wherein the pad clip includes two or more arms that are generally parallel and generally planar, and the dampening clip is connect to each of the arms.

Another unique aspect of the present teachings is a brake system comprising the pad clip of the teachings herein, wherein the brake system includes a support bracket and two brake pads and the pad clip is located between the support bracket and the two brake pads on each end of the two brake pads, and wherein each of the dampening clips are located between the support bracket and the pad clip.

The present teachings provide a device that reduces brake noise during running, a brake apply, a brake retract or a combination thereof. The teachings herein provide a device that minimizes movement of the brake pads and/or pad clips relative to the support bracket. The teachings herein provide a device that dampens vibrations between the brake pads and the pad clips, the pad clips and the support brackets, or both.

DETAILED DESCRIPTION

Figure 1:
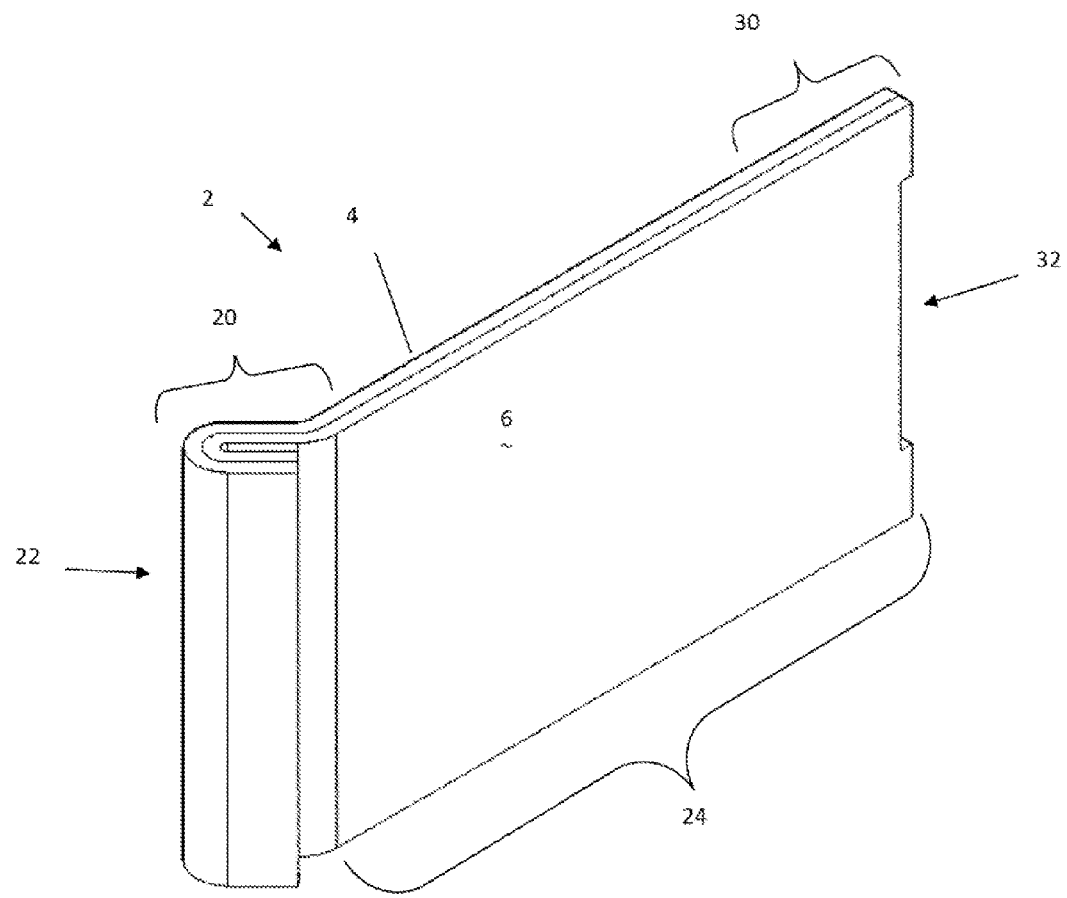
FIG. 1 shows a perspective view of a dampening clip.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved dampening clip for a disc brake system and caliper for use with vehicles. For example, a dampening clip may be used with almost any vehicle (e.g. car, truck, bus, train, airplane, or the like). Alternatively, the dampening clip and brake system may be integrated into assemblies used for manufacturing or other equipment that require a brake such as a lathe, winder for paper products or cloth, amusement park rides, wind turbines, or the like. However, the present teachings are most suitable for use with a passenger vehicle (i.e. a car, truck, sports utility vehicle, or the like).

Generally, a braking system includes a rotor, a caliper body, and a support bracket. The brake system includes an inboard brake pad and an outboard brake pad that are located on opposing sides of the rotor. The caliper body further includes a bridge, one or more fingers, and a piston bore. The piston bore may include a piston. The piston bore may include a fluid inlet, a closed wall, a front opening, a cylindrical side wall that includes an annular groove located near the front opening, and a seal in the annular groove. The support bracket may include one or more pad clips that assist in holding the one or more brake pads. The pad clips may be any pad clip that may hold one or more brake pads. Preferably, the pad clips connect an ear of one or more brake pads to the support bracket.

The brake system may include one or more pad clips. Preferably, the brake system includes at least two pad clips. More preferably, a first pad clip is placed one side of the one or more brake pads and a second pad clip is placed on the opposite side of the one or more brake pads. The brake system may include three pad clips. For example, one side may include a pad clip that holds both ears of both brake pads and the opposite side may have two discrete pad clips, each pad clip holding a single brake pad. The brake system includes four pad clips. Two pad clips may be placed on each side of the rotor and two pad clips are placed opposite sides of the one or more brake pads. It is contemplated that any of the configurations discussed herein may be employed in the one, two, three, four, or more pad clip designs discussed herein.

The one or more pad clips may include a bridge portion connecting one or more arms. The pad clip may be free of a bridge portion. The bridge portion may be a portion of the pad clip that connects the arms together. The bridge portion may pass over the rotor. The pad clip may not include a bridge portion; thus, two discrete clips may be formed. The two discrete pad clips without a bridge portion may be identical in all other aspects to a clip with a bridge portion.

Each of the one or more pad clips may include one or more arms that project from the bridge portion. Preferably, the pad clip includes two arms. Preferably, a pad clip that includes two arms may have the two arms projecting away from each other. More preferably, the two arms project away from the rotor. The pad clip may include only one arm. The pad clip may include one arm that projects out from one side of the pad clip, and another pad clip may include one arm the projects out from the opposite side of the pad clip. There may be a "right" side pad clip and a "left" side pad clip. Preferably, when more than two pad clips are used a right side pad clip and a left side pad clip are placed on opposite sides of the rotor so that the right side pad clip has an arm, a lip, a locator, or a combination thereof that projects to the right and away from the rotor, on a right side of the rotor, or both and the left pad clip has an arm, a locator, a lip, or a combination thereof that projects to the left and away from the rotor, on the left side of the rotor, or both when viewing the clip and support bracket so that an angled bracket is visible, is extending towards the an opposing angled bracket, or both.

The one or more arms may project laterally from the bridge portion, longitudinally from the bridge portion, or a combination thereof. Preferably, the one or more arms may project down, vertically, from the ends of the bridge and away from the bridge, or a combination thereof from the bridge portion of the pad clip. More preferably, the one or more arms may project out from the sides of the bridge portion and then extend along the same plane as the bridge portion. The one or more arms may be planar with the bridge portion. Preferably, the one or more arms may be substantially planar (i.e., 60 percent or more, 70 percent or more, or 80 percent or more by length) with the bridge portion and may have one or more curved portions that are not planar with the bridge portion. More preferably, the one or more arms may be substantially planar and include one or more substantially perpendicular portions that project away from the arms, the bridge portion, or both. When more than one arm is present the arms may be generally parallel, generally symmetrical, generally planar, or a combination thereof relative to each other. The one or more arms may project out from the bridge portion of the pad clip and make a "U" shaped turn back towards the bridge portion of the pad clip. For example, the arms may include an angled bracket that may substantially mirror the shape of the abutment of the support bracket. The arms may be a single piece of material. The arms may be one or more pieces of material.

The arms and the bridge portion may be made of the same material. The arms and bridge portion may be made of different materials. Preferably, the pad clip (i.e. arms, bridge portion, or both) may be made of metal. The pad clip may be made of titanium, aluminum, steel, copper, iron, nickel, cobalt, or a combination thereof. More preferably, the arms may be made of stainless steel. Even more preferably yet, the pad clip may be made of a material that has a 301 3/4H when measured by ASTM A666 or may be SU301-CSP 3/4H when measured by JIS G4313. Preferably, the pad clip is made of 301 3/4H stainless steel. The pad clip may be made of a material that is resistant to corrosion. The pad clip may be made of any material capable of being formed. The pad clip may be made of a material that is deformable. Preferably, the pad clip may be made of a material that is elastically deformable. The clip may be formed by any process capable of creating a clip with arcuate portions. The clip may be formed by casting, stamping, cutting, bending, molding, deep drawing, spinning, press brake forming, roll forming, ironing, wheeling, incremental sheet forming, decambering, or a combination thereof. Preferably, the pad clip may be made from a metallic sheet, a coil, a roll, or a combination thereof.

The pad clip may include one or more locators. Preferably, the one or more locators may be attached to the one or more arms of the pad clip. More preferably, the one or more locators may project from opposite sides of the one or more arms. The one or more locators may be located on the outside edge of each of the arms. Preferably, the one or more locators may be located on an inside edge of the arms (i.e. closest to the rotor). More preferably, the one or more locators may be located on an inside edge of the arms so that the rotor passes next to the locator. Each of the arms of the pad clips may include more than one locator. For example, each arm may have a locator on an inside edge and an outside edge. The locator may project out from the arm. The locator may project out and be planar to the one or more arms. Preferably, the locator is substantially perpendicular to the arms. The locator may attach to the angled bracket of the pad clip. The size of the locator may be larger or smaller based on where the locator may be found on the pad clip. For example, a locator attached to the angled bracket may be smaller than a locator connected opposite the one or more arms. The one or more locators may secure the clip to the support bracket so that the clip does not move relative to the support bracket and/or rotor.

The locator may assist in holding a pad clip in place. For example, the pad clip may not contact the abutment of the support bracket and the locator may fixedly hold the clip in place so that during a brake apply the force of the brake pads pushing against the pad clip does not push the clip into contact with the rotor. However, in another example, the pad clip may be pushed by the brake pad towards the abutment or into contact with the abutment and the locator may push the pad clip away from the abutment when the brakes are released.

The locator may further assist in holding the pad clip on the abutment so that the pad clip does not slide in the apply direction or the retract direction. For example, during a brake apply the brake pads may push on the lip of the one or more arms, a brake pad connection feature, or both and the locator may hold the arms in place so that the pad clip does not move relative to the support bracket. The one or more locators may further assist in holding the pad clip in place during a brake retract so that the pad clip is held in place relative to the support bracket. The locator may form an angle with the arms. The locator may form an angle between about 20 degrees and 140 degrees, preferably between about 45 degrees and 125 degrees, more preferably between about 75 degrees and 100 degrees (i.e. about 90 degrees). The locator may be substantially flat and planar. The locator may include an arcuate portion. The arcuate portion may form a raised surface so that the locator assists in holding the pad clip in the abutment. Preferably, the locator may project out substantially perpendicular to the arms. More preferably, the locator may project towards the support bracket and contact a wall of the support bracket so that the pad clip is held in place. The one or more locators may be located opposite a lip.

The lip may be a locator. The lip may be part of a locator. The lip may be an angled portion, a curve, a terminating portion, or a combination thereof of the locator. The lip may extend laterally from one or both of the arms. Preferably the lip extends from an outside of the arms, away from a rotor, or both. The lip may assist the pad clip in connecting to the brake system, may align the pad dip on the support bracket, or both.

The pad clip may attach to a portion of the brake system. The pad clip may attach to the caliper. Preferably, the pad clip may attach to the support bracket. More preferably, the pad clip may be placed in, on, connected to, or a combination thereof an abutment of the support bracket. The pad clip may be temporarily secured to the abutment of the support bracket. The pad clip may be fixedly secured to the abutment of the support bracket. Preferably, the pad clip may be removably secured to the abutment of the support bracket (i.e. the pad clip may be locked in, on, to, or a combination thereof the abutment and removed when changing the brake pads). The one or more pad clips included in the brake system may be identical. The pad clips may be different. The brake system may include an angled pad clip on the side of the support bracket that is in the direction of rotation of the rotor (i.e. the leading edge), and a non-angled pad clip on the side of the support bracket that is facing a direction opposite to that of the rotation of the rotor (i.e. trailing edge).

The pad clip may include one or more angled brackets. The one or more angled brackets may mirror (i.e. follow or match) a portion of the support bracket. Preferably, the one or more angled brackets form a "U" shape or a "C" shape. More preferably, the one or more angled brackets may substantially conform to the shape of the abutment and assist in retaining the clip in place so that the clip does not move during operation. The one or more angled brackets may extend over the angled bracket, the dampening clip, or both so that the pad clip, the dampening clip, or both are connected to the abutment of the support bracket. The angled brackets may include one or more bias tabs.

The one or more bias tabs may be any size and shape so that the bias tabs assist in connecting a dampening clip to the support bracket, assist in connecting the dampening clip to the pad clip, or both assist in connecting the pad clip to the support bracket, or a combination thereof. The one or more bias tabs may be angled so that the bias tabs grip an abutment of the support bracket. The one or more bias tabs may be configured so that the bias tabs are part of an angled bracket. The one or more bias tabs may form a cantilever connection with a portion of the angled bracket. The one or more bias tabs may have a generally shaped portion, a generally "C" shaped portion, or both. The one or more bias tabs may form a recess in the pad clip, the angled bracket, or both. The one or more bias tabs may be an absence of material so that a cantilever portion is formed. Preferably, the bias tabs are a combination of an absence of material and a cantilever portion so that a bias force may be created by the bias tabs. The one or more bias tabs may assist in connecting the pad clip to the support bracket, an abutment, or both and may assist in connecting a dampening clip to the support bracket, pad clip, adjacent component, or a combination thereof.

The adjacent component may be any component of the brake system that may produce noise, vibrations, harshness (NVH), or a combination thereof during running, a brake apply, a brake retract, or a combination thereof. The dampening clips of the teachings herein may connect to one or more adjacent components of the braking system so that NVH is substantially reduced and/or eliminated from the brake system. The adjacent component may be a caliper, support bracket, brake pad, ear of a brake pad, abutment of a support bracket, pad clip, or a combination thereof. Preferably, the adjacent component is an abutment of the support bracket, a region proximate to the support bracket, a pad clip, or a combination thereof. Most preferably, the adjacent component is a pad clip. The dampening clip may connect to a lip, an angled bracket, a bias tab, or a combination thereof of the pad clip; an abutment, a region proximate to the abutment, or both of the support bracket; or a combination of the support bracket and pad clip.

The one or more dampening clips may be any device that assists in reducing NVH between the pad clip and support bracket, pad clip and brake pads, or both. The dampening clip may be a combination of one or more materials that dampens vibrations between two or more adjacent structures during running, a brake apply, a brake retract, or a combination thereof. The dampening clip may connect to a support bracket, a pad clip, or both. The one or more dampening clips may connect to a pad clip on a leading side, a trailing side, or both. The dampening clip may include one or more connection portions, one or more body portions, or both.

The one or more body portions may be any part of the dampening clip that reduces and/or substantially eliminates noise, vibration, or harshness (NVH) in the brake system. The one or more body portions may be any part of the dampening clip that extends between a support bracket and a pad clip, between a pad clip and a brake pad, or both. The one or more body portions may be substantially planar, may include contours, may mirror the shape of the pad clip, may mirror the shape of the support bracket, or a combination thereof. The one or more body portions may be integrally connected, removably connected, or both to a connection portion.

The connection portion may be any portion of the dampening clip that connects the dampening clip to a pad clip, a support bracket, or both. The connection portion may connect the dampening clip to an abutment, a region proximate to the abutment, or both of the support bracket. Preferably, the connection portion connects the dampening clip to a lip of the pad clip, a bias tab of the pad clip, or both. The connection portion may extend into a portion of the pad clip, extend around a portion of the pad clip, around a portion of the support bracket, or a combination thereof. The connection portion may provide a gripping force on a portion of the pad clip, a portion of the support bracket, or both. The gripping force may be a sufficient amount of force so that gripping force connects the dampening clip to the pad clip, the support bracket, or both and prevents the dampening clip from being removed by normal movement during a brake apply, a brake retract, running, or a combination thereof. The gripping force may be about 2 N or more, about 5 N or more, about 7 N or more, or about 10 N or more. The gripping force may be about 30 N or less, about 25 N or less, or about 20 N or less. The connection portion may be planar with the body portion, may have a portion that is planar with the body portion, may be entirely in a different plane than the body portion, or a combination thereof. Preferably, the connection portion extends out of the plane of the body portion and conforms to the shape of a portion of the pad clip, a lip of the pad clip, a bias tab of the pad clip, an abutment of the support bracket, or a combination thereof. The connection portion may be generally "U" shaped, generally "C" shaped, may fold back upon itself, may be two sided, may be three sided, or a combination thereof. The connection portion may include one or more locking tabs, one or more fingers, or both.

The one or more fingers may be any size and shape so that all or a portion of the one or more fingers may extend into, through, around, or a combination thereof a portion of the pad clip, a lip of the pad clip, a bias tab of the pad clip, a portion of the support bracket, an abutment of the support bracket, or a combination thereof. Preferably, at least one of the one or more fingers extends into a gap, hole, space, recess, or a combination thereof formed by the bias tabs of the pad clip. The one or more fingers may all extend at the same angle, different angles, be movable relative to each other, or a combination thereof. More preferably, at least one finger is a locking tab and the locking tab that extends inward, below, at a different angle, has a smaller radius, or a combination hereof than the other fingers so that the locking tab when connected to a bias tab prevents axially movement, relative to the rotor, of the dampening pad.

The one or more locking tabs may be any part of the dampening clip, the connection portion, or both that extends into, around, through, or a combination thereof a portion of a pad clip, a support bracket, or both. Preferably, the locking tabs conform to a piece of the pad clip so that the locking tab assists in connecting the dampening clip to the pad clip. The locking tabs may form the gripping force discussed herein. The one or more locking tabs may extend at an angle relative to the fingers. The angle may be any angle so that a gripping force is created, so that the locking tabs extend into a bias tab, conform to a shape of an abutment, or a combination thereof. The angle of the one or more locking tabs may be about 5 degrees or more, about 10 degrees or more, about 15 degrees or more, or about 20 degrees or more. The angle of the locking tabs may be about 75 degrees or less, about 60 degrees or less, or about 45 degrees or less. The locking tabs may prevent axial movement, relative to the rotor, of the dampening clip independent of the pad clip. For example, during a brake apply the brake pads move axially relative to the rotor and the locking tabs may lock the dampening clip to the pad clip so that axial movement of the dampening clip is prevented. The locking tabs may be located at any location on the dampening clip so that the locking tabs assist in forming a connection between the dampening clip and an adjacent component. Preferably, the connection portion, which may include the locking tabs, is located in a forward region, a rearward region, or both.

The forward region of the dampening clip may be any portion of the dampening clip. The forward region may be a portion of the dampening clip located axially the farthest from the rotor, located on the outside regions of the pad clip, or both. The forward region may include a connection portion, a locking portion, or both. Preferably, the forward region includes a connection portion so that the forward region assists in forming a fixed connection between the dampening clip and a pad clip. Preferably, when connecting a dampening clip to an adjacent component the forward region is the first region that is moved into contact with and connected to the adjacent component. The forward region may be located directly opposite a rearward region.

The rearward region may be any region of the dampening clip that may be located axially closest to the rotor, located inside of the pad clip, may be in contact with a brake pad, or a combination thereof. The rearward region may be the last part of the dampening clip connected when the dampening clip is connected to an adjacent component. The rearward region may be free of any connection features, locking portions, or both. The rearward region may include a locking portion.

The locking portion may be any part of the dampening clip that prevents axial movement, relative to the rotor, of the dampening clip, the rearward region, or both. The locking portion may connect to, extend around, extend through, or a combination thereof a portion of an adjacent component. The locking portion may prevent rotation of the dampening clip about a portion of the forward region, about the locking tab, about one or more of the fingers, or a combination thereof. The locking portion may be a projection that extends from an end of the dampening clip. The locking portion may be an absence of material, a recess, a cutout, one or more contours, or a combination thereof within the rearward region of the dampening clip. Preferably, the locking portion extends around a portion of the pad clip. More preferably, the locking portion extends around a portion of a locator of the pad clip. The locking portion may prevent movement of the dampening clip that is substantially perpendicular, perpendicular, or both to an axis of the rotor. The locking portion may prevent axial movement, radial movement, or both. The locking portion may maintain the dampening clip in a predetermined location so that the dampening material of the dampening clip substantially reduces and/or eliminates NVH in a part of the brake system that includes the dampening clip.

The dampening material may be any material that substantially reduces and/or eliminates noise, vibration, harshness, or a combination thereof caused by two or more components of the braking system contacting each other. The dampening material may be in contact with a support bracket, a pad clip, a portion of a brake pad, or a combination thereof. The dampening material may be free of contact with a support bracket, a pad clip, a portion of a brake pad, or a combination thereof. The dampening material may be a material with a lower hardness than the brake components in-between which the dampening material is located. The dampening material may be one or more layer, two or more layers, three or more layers, or even four or more layers of dampening material. Each of the layers may be the same material, different materials, or a combination of materials. The dampening material may be made of a material that performs one or all of the functions of the support material so that a support material is not required to perform the functions of the dampening clip. The dampening material may include an elastomeric composition. The dampening material may be a natural material, a synthetic material, a composition, a combination of two materials, a polymeric, an elastomeric, plastic, a polymer, ceramic, a coating, rubber, acrylic, silicone adhesive, or a combination thereof. Preferably, the dampening material is rubber and/or includes rubber. The dampening material may be sufficiently rigid so that the dampening material may be formed and placed on an adjacent component, but sufficiently soft so that the dampening material reduces and/or eliminates NVH. For example, the dampening material may be free of a supporting material. The dampening material may be formable so that the dampening material may be conformed to the shape of an adjacent component, a support material, or both. The dampening material may be added to a support material so that the dampening material conforms to the support material and so that the support material provides the shape, structure, connection, or a combination thereof to the adjacent component. The dampening material may extend along a first side, a second side, or both of the support materials. The dampening material may completely surround the support material, may partially surround the support material, may be located on one side, may be located on both sides, may be located in edge regions, may be located, in a central part of one or both sides, may be applied to local portions so that the dampening material is located only at contact locations, may be bonded to the support material, laminated to the support material, may be manufactured with the support material so that the two materials are intertwined, may be applied in a green tacky stated and cured so that a bond is formed, or a combination thereof.

The material used to join a support material to dampening material may assist in providing dampening. The material (e.g., adhesive, lamination material, bonding material, or a combination thereof) may be any material that connects two or more layers together. The material may be elastic, flexible, rigid, or a combination thereof and provide a fixed connection between the dampening material and the support material, two or more layers of dampening material, two or more layers of support material, or a combination thereof.

The support material may be any material that connects a dampening clip to an adjacent component, maintains a dampening material in a static location, assists in providing a reduction in noise, vibration, harshness, or a combination thereof. The support material may be in contact with a support bracket, a pad clip, a portion of a brake pad, or a combination thereof. The support material may free of contact with a support bracket, a pad clip, a portion of a brake pad, or a combination thereof. For example, the support material may be exposed on one side and contact a support bracket and the dampening material may be exposed on the opposing side and contact the pad clip. The support material may be one or more layers, two or more layers, or three or more layers that provide support to the dampening material, assist in connecting the dampening material into the brake system, or both. The dampening clip may be free of a support material. For example, the dampening material may be of sufficient rigidity so that the dampening material may be used to connect the dampening clip to a support bracket, a pad clip, or both. The support material may be any material that may be shaped, formed, or both. The support material may be any material that may be configured to grip an adjacent component, provide a gripping force, or both. The support material may be made of any material that is shapeable, formable, elastically deformable, plastically deformable, or both. The support material may include metal, plastic, a polymer, ceramic, or a combination thereof. Preferably, the support material is steel, stainless steel, aluminum, a metal that does not corrode, or a combination thereof. The dampening material and the support material may be two generally parallel layers that are connected together.

FIG. 1 illustrates a perspective view of one example of a dampening clip 2 of the teachings herein. The dampening clip 2 includes a body portion 24 having a forward region 20 on one end and a rearward region 30 on an opposing end. The forward region 20 includes a connection portion 22 so that the dampening clip 2 can be attached to an adjacent structure. The end region 30 includes a locking portion 32 for forming an interfitted connection with an adjacent structure (not shown). The dampening clip 2 as illustrated is made of a dampening material 4 and a supporting material 6, and as illustrated that form to connected layers.

Figure 2:
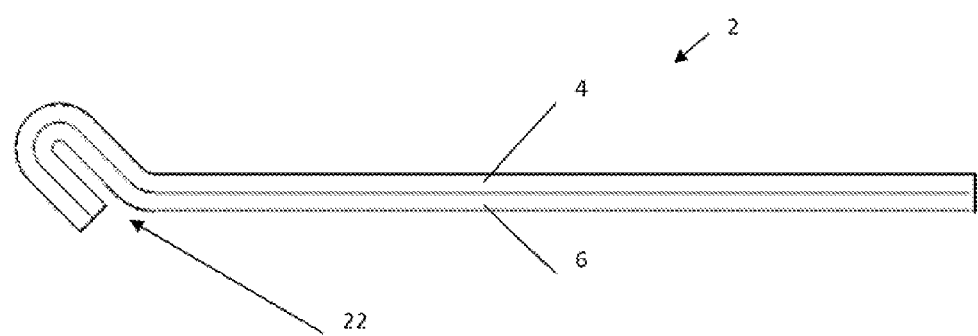
FIG. 2 illustrates a side view of a dampening clip.

FIG. 2 illustrates a side view of the dampening dip 2 of FIG. 1. As illustrated, the dampening material 4 and the supporting material 6 are two or more generally parallel layers that are connected together. The dampening clip 2 includes a connection portion 22 that forms a hook shape for connecting the dampening clip 2 to an adjacent structure (not shown).

Figure 3:
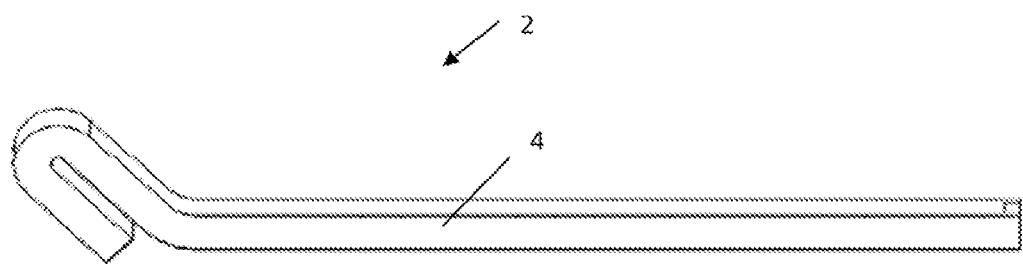
FIG. 3 illustrates a side view of another dampening clip of the teachings herein.

FIG. 3 illustrates a side view of another example of a dampening clip 2 taught herein. The dampening dip 2 has a dampening material 4 that completely surrounds the supporting material so that the supporting material is not visible.

Figure 4:
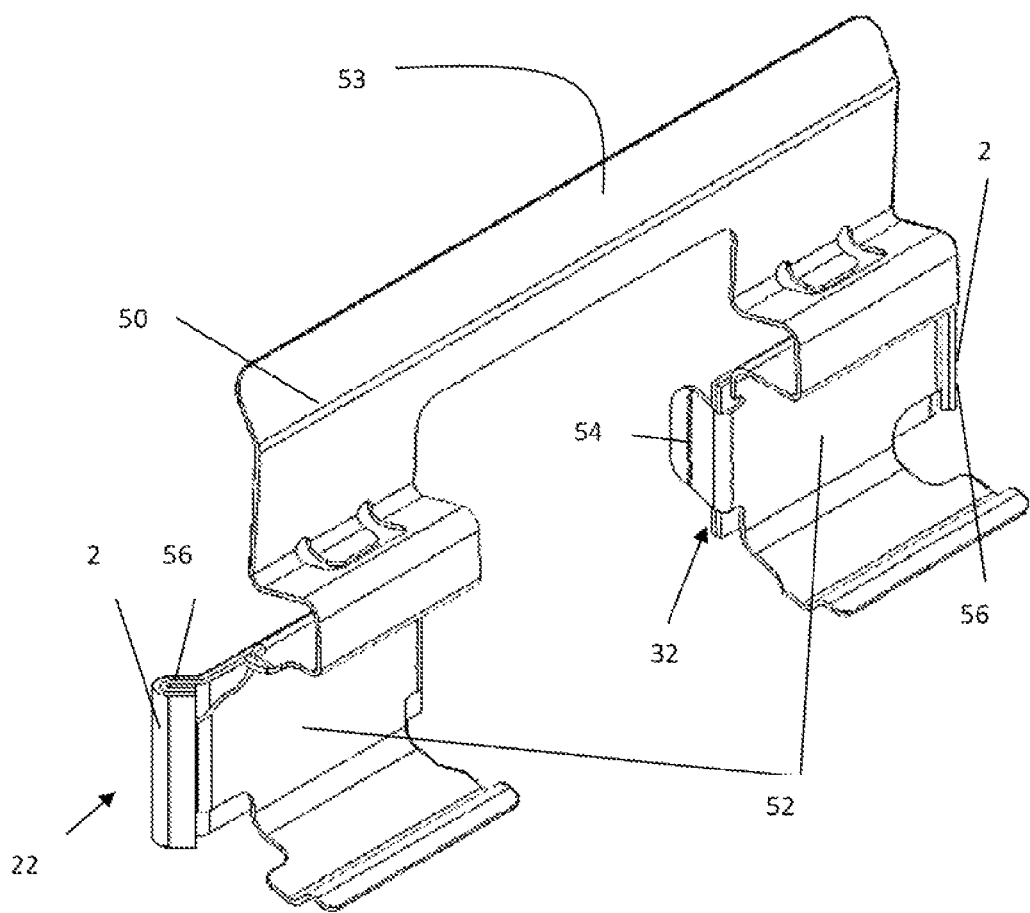
FIG. 4 illustrates a perspective view of a pad clip including two dampening clips of the teachings herein.

FIG. 4 illustrates a pad clip 60 having two generally parallel arms 52 connected by a bridge 53. Each of the arms 52 include a locator 54 on an inner portion of the pad clip 50 and a lip 56 on an outer portion of the pad clip 50. Each of the arms 52 include a dampening clip 2 connected to the arm 52 via the connection portion 22 which is attached to the lip 56 and a locking portion 32 connected to the locator 54.

Figure 5:
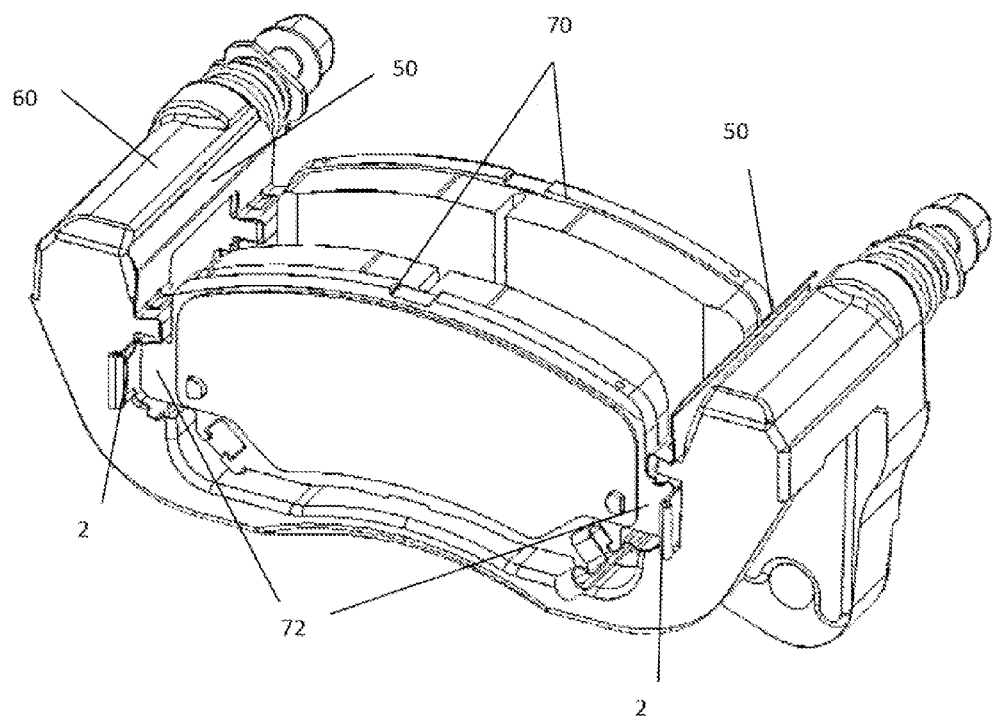
FIG. 5 illustrates a partial brake system including a pad clip and dampening clip of the teachings herein.

FIG. 5 illustrates a support bracket 60 including the pad clips 50 and dampening clip 2. The pad clips 50 and dampening clips 2 are located between the support bracket 60 and an ear 72 of a brake pad 70 so that during a brake apply, a brake release, running, or a condition therebetween the brake pads contact all or a portion of the dampening clip 2 so that noise, vibration, and harshness are minimized and/or reduced.

Figure 6:
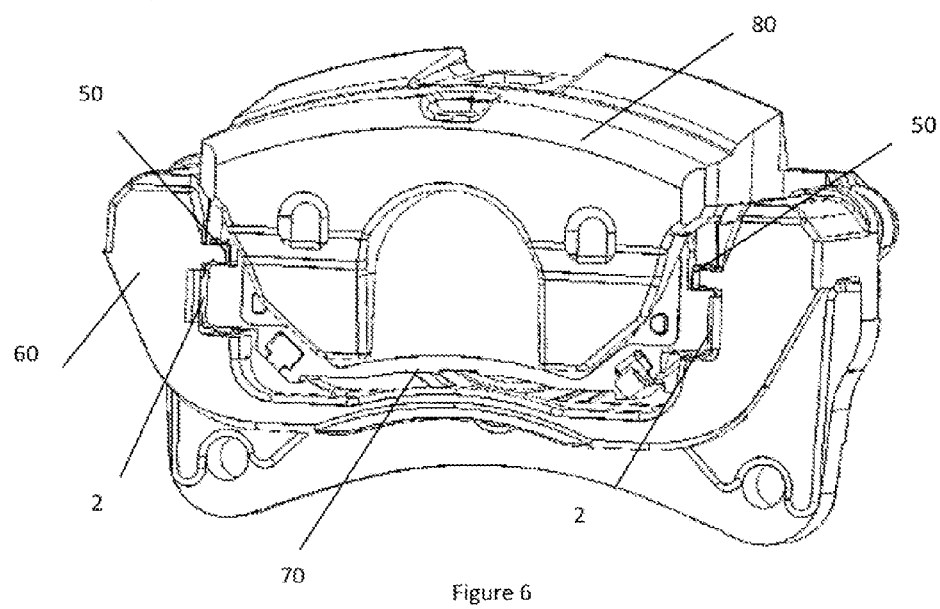
FIG. 6 illustrates and example of a brake system including the dampening clips of the teachings herein.

FIG. 6 illustrates a brake system 100 including a caliper 80, a support bracket 60, and brake pads 70. A pad clip 50 is located on each side of the brake pads 70, and the pad clip is located between the brake pads 70 and the support bracket 60. The dampening clips 2 are connected to the pad clips 50.

Figure 7:
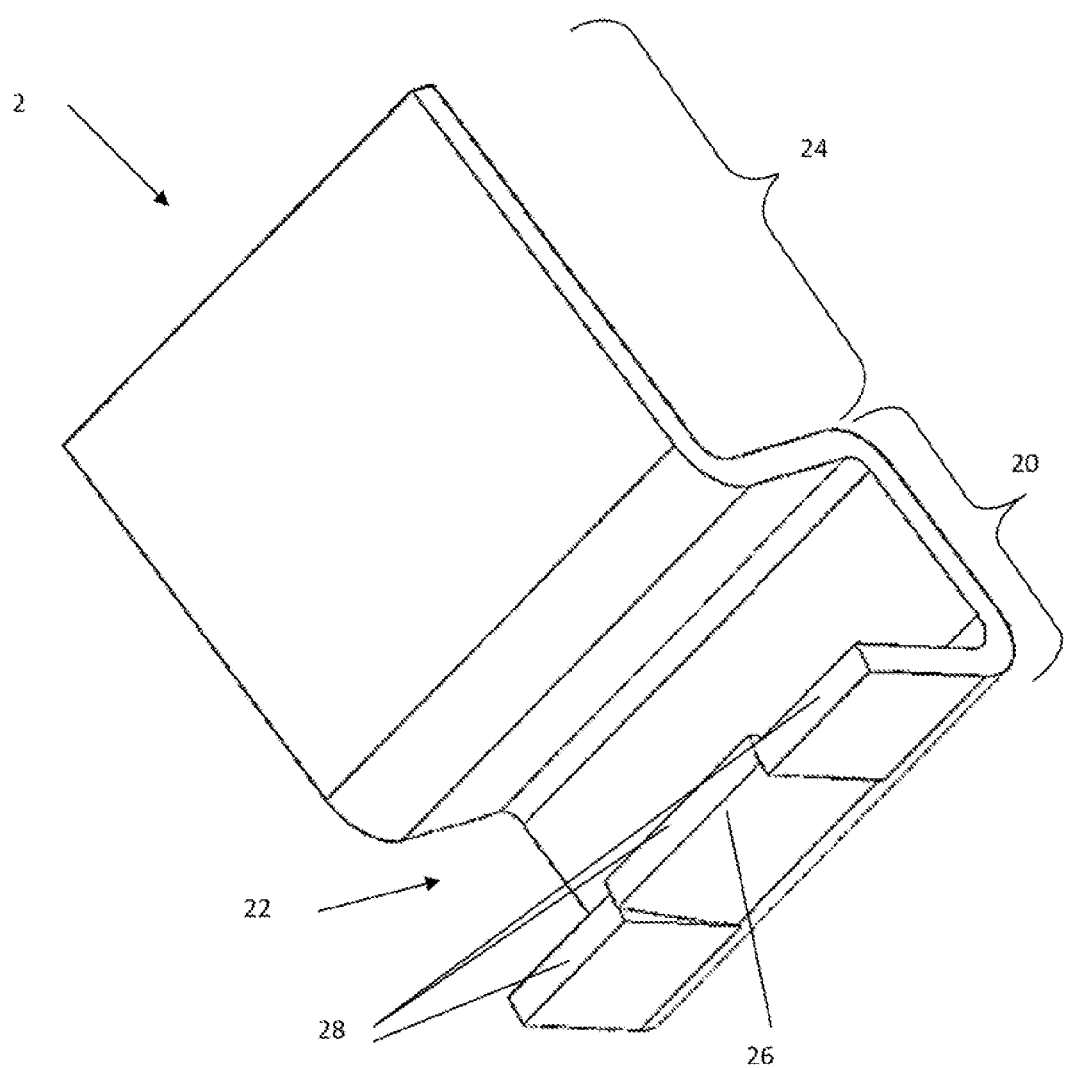
FIG. 7 illustrates a front perspective view of another example of a dampening clip of the teachings herein.

FIG. 7 illustrates another example of a dampening clip 2 of the teachings herein. The dampening clip 2 includes a body portion 24 and a forward region 20. The forward region 20 includes a connection portion 22 having fingers 28. As illustrated, the center finger 28 is a locking tab 26 for forming a fixed connection to an adjacent component (not shown).

Figure 8:
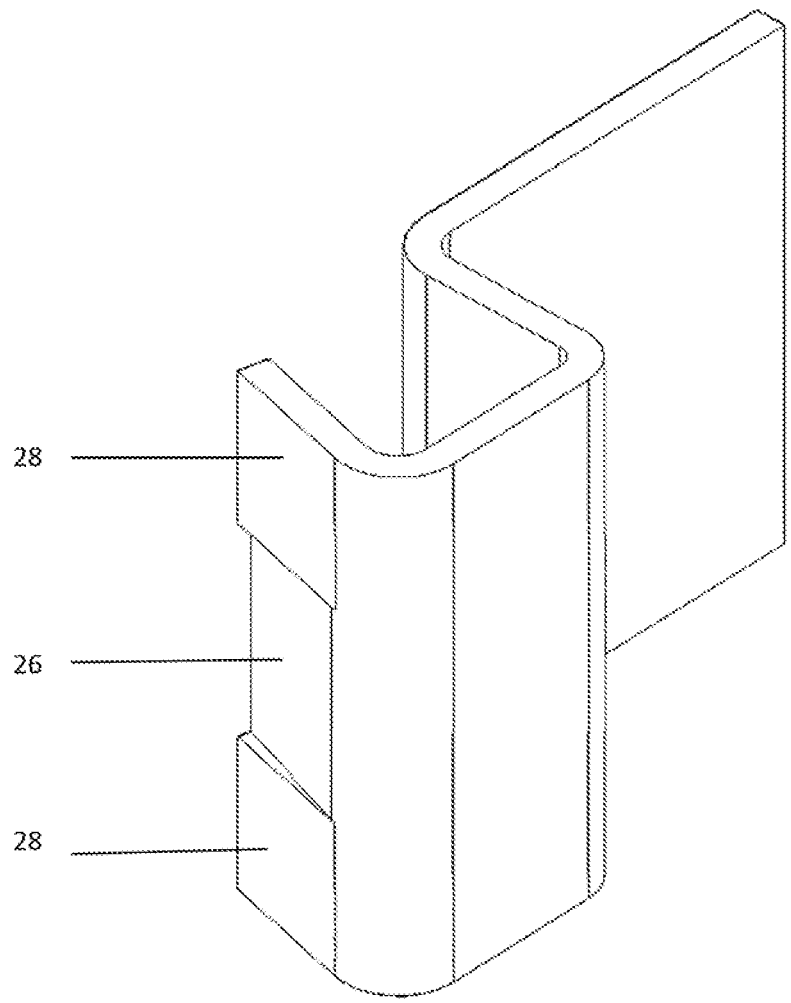
FIG. 8 illustrates a rear perspective view of an example of a dampening clip of the teachings herein.

FIG. 8 illustrates the locking tab 26 extending inward of the surrounding fingers 28.

Figure 9:
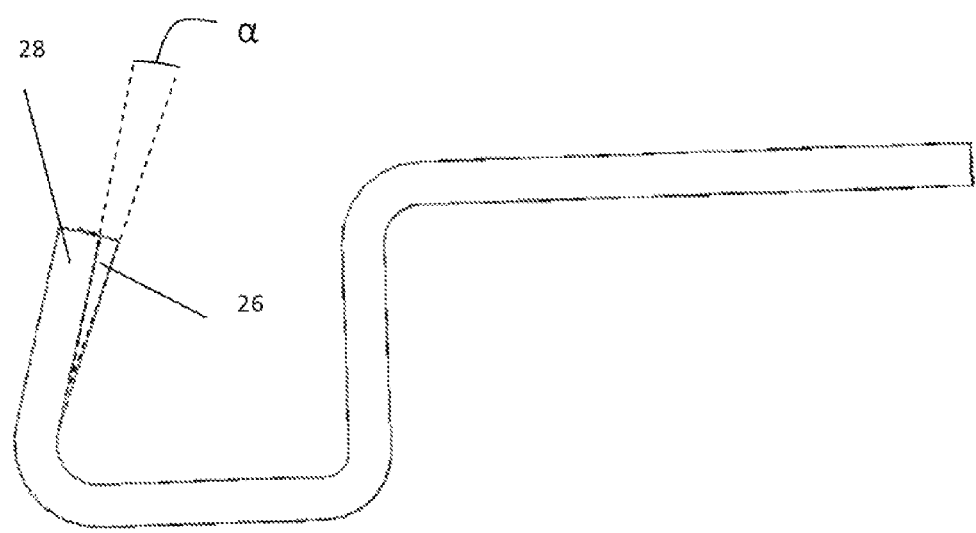
FIG. 9 illustrates a side view of a dampening clip.

FIG. 9 illustrates a side view of the dampening dip 2 of FIG. 8 showing the locking tab 26 extending inward of the two opposing fingers 28. The locking tab 26 extends below the fingers 28 and at an angle ($\alpha$) so that the locking tab 26 assists in forming a connection with an adjacent component (not shown).

Figure 10:
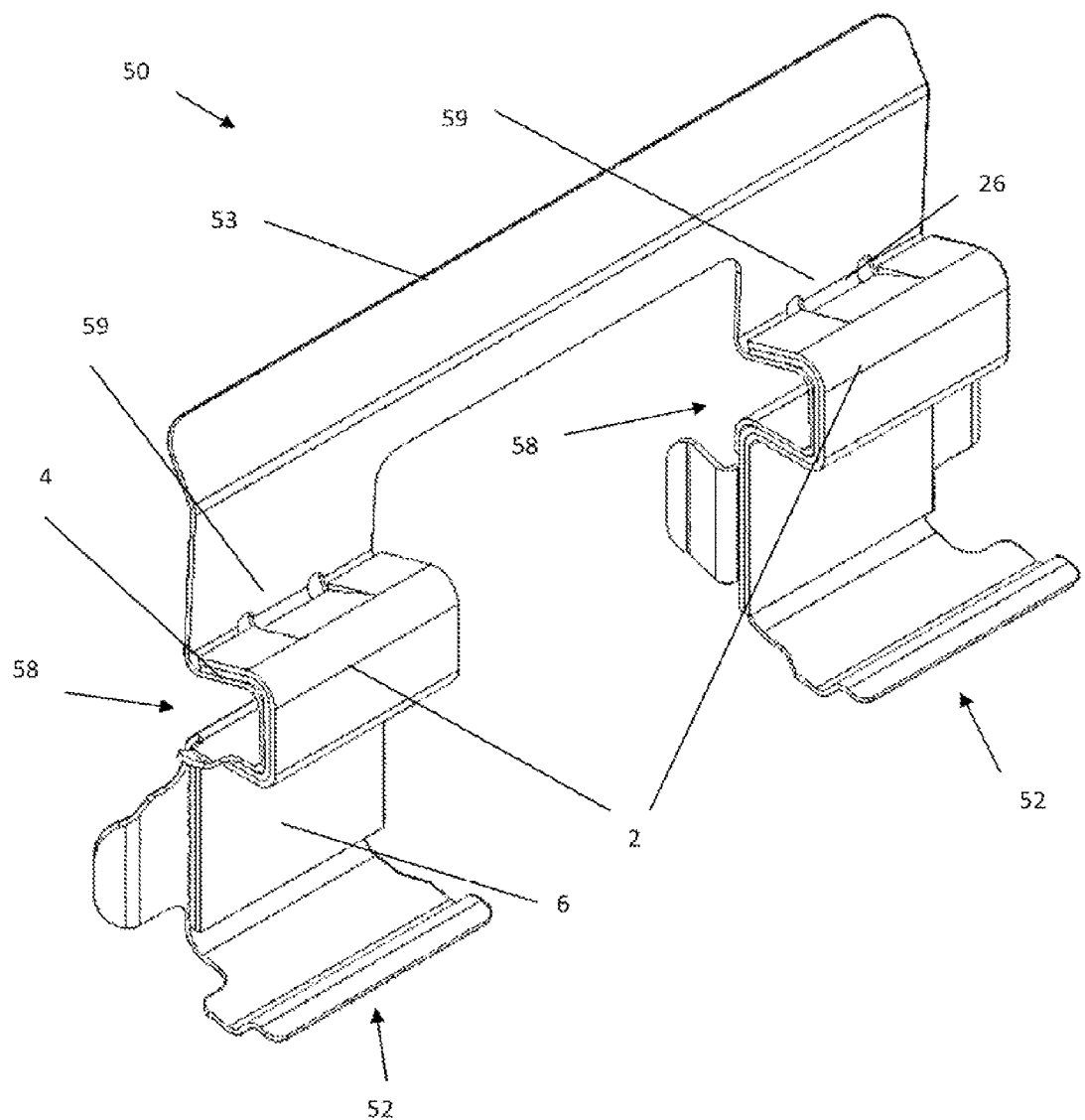
FIG. 10 illustrates a pad clip including dampening clips of the teachings herein.

FIG. 10 illustrates a pad clip 50 having two opposing arms 52 that are generally parallel and connected by a bridge 53. Each of the arms 52 includes an angled bracket 58 and a bias tab 59. A dampening clip 2 is located on each of the arms 52 and connects to the angled bracket 58 by the locking tab 26 extending into the bias tab 59 so that a fixed connection is formed between the pad clip 50 and the dampening clip 2. The dampening clip 2 includes a dampening material 4 on a rear surface of a supporting material 6 so that the dampening material 4 reduces and/or eliminates noise, vibration, and harshness during running, a brake apply, a brake release, or a condition therebetween caused by contact between the pad clip 50 and an adjacent brake component (not shown).

Figure 11:
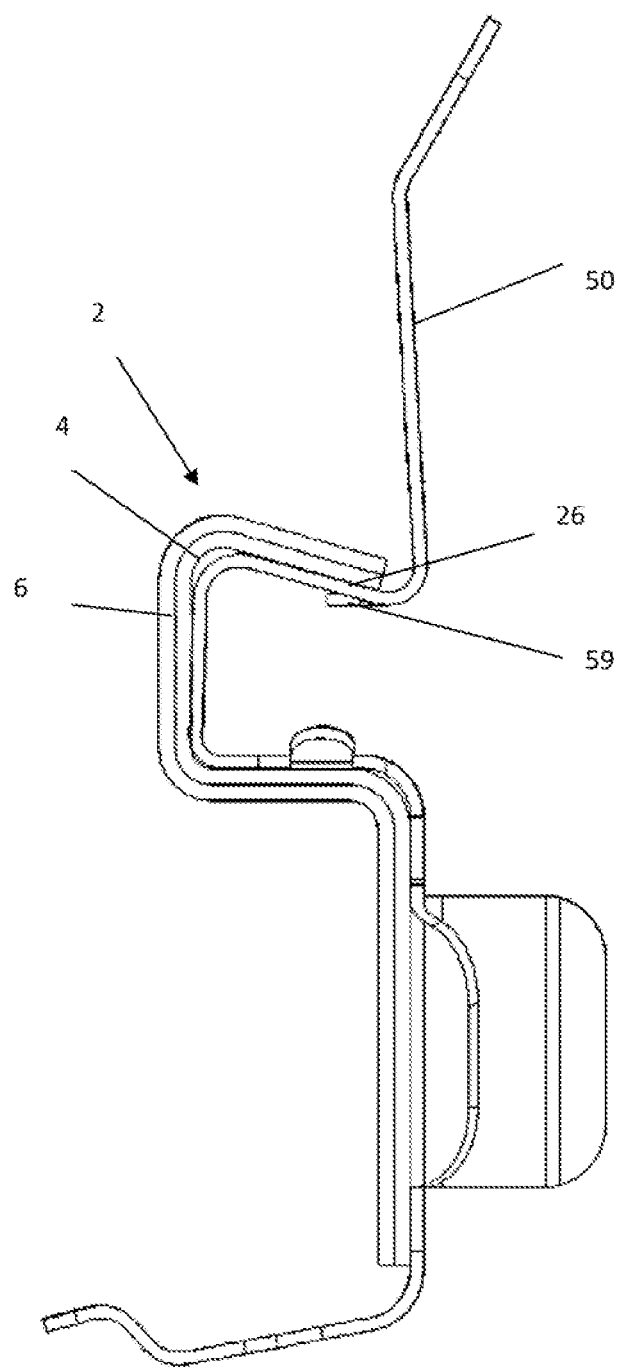
FIG. 11 a side view of a pad clip including a dampening clip of the teachings herein.

FIG. 11 illustrates a side view of the pad clip 50 and dampening clip 2 of FIG. 10. The pad clip 50 includes a bias tab 59 that extends downward and creates an opening where the locking tab 26 of the dampening clip 2 extends into so that the pad clip 50 and the dampening clip 2 are connected. The dampening clip 2 includes a dampening material 4 that is in contact with the pad clip 50 and a supporting material 6 that faces away from the pad clip.

Figure 12:
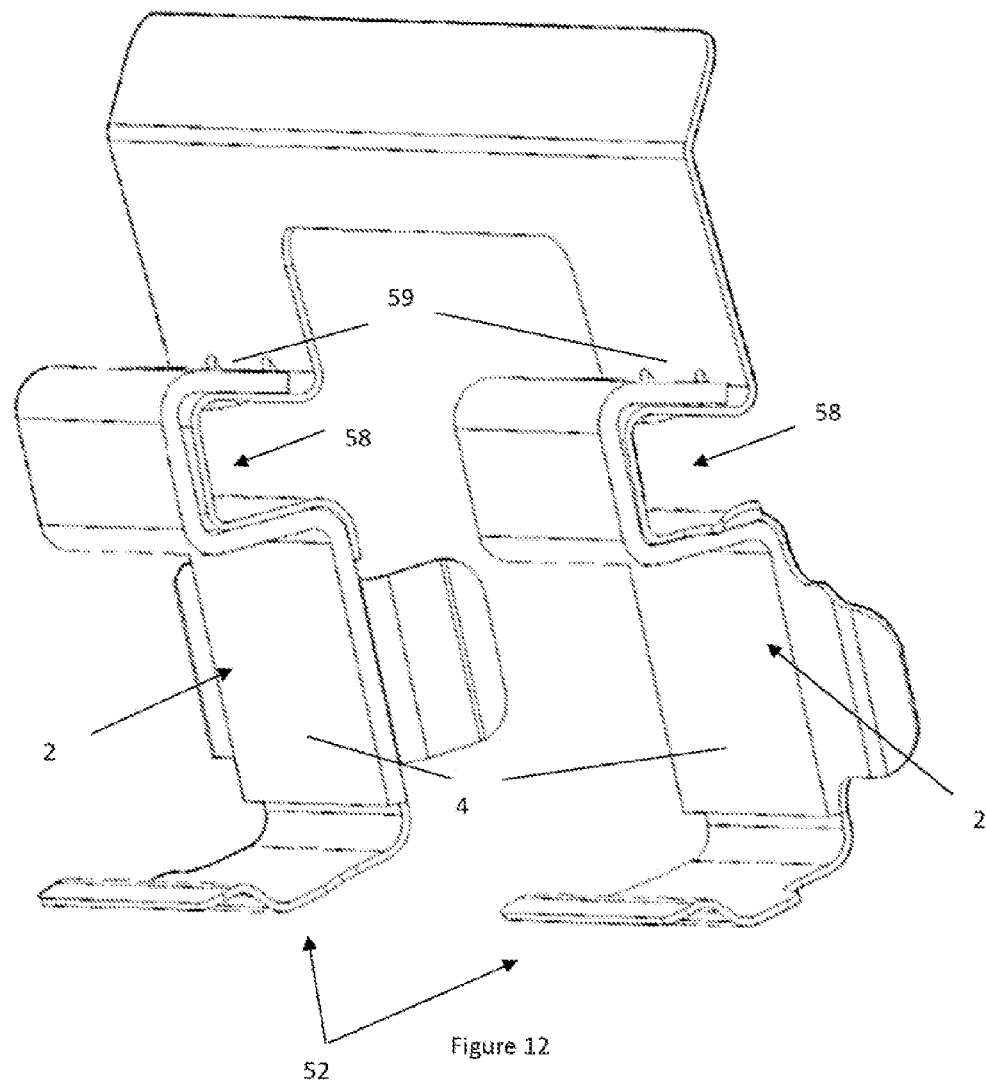
FIG. 12 illustrates a perspective view of a pad clip including another example of dampening clips of the teachings herein.

FIG. 12 illustrates another dampening clip 2 of the teachings herein connected to and extending substantially the length of an arm 52 of a pad clip 50. Each of the dampening clips 2 mirrors the shape of the arms 52 so that the dampening clips 2 extend over the angled brackets 58 and into the bias tabs 59.

Figure 13:
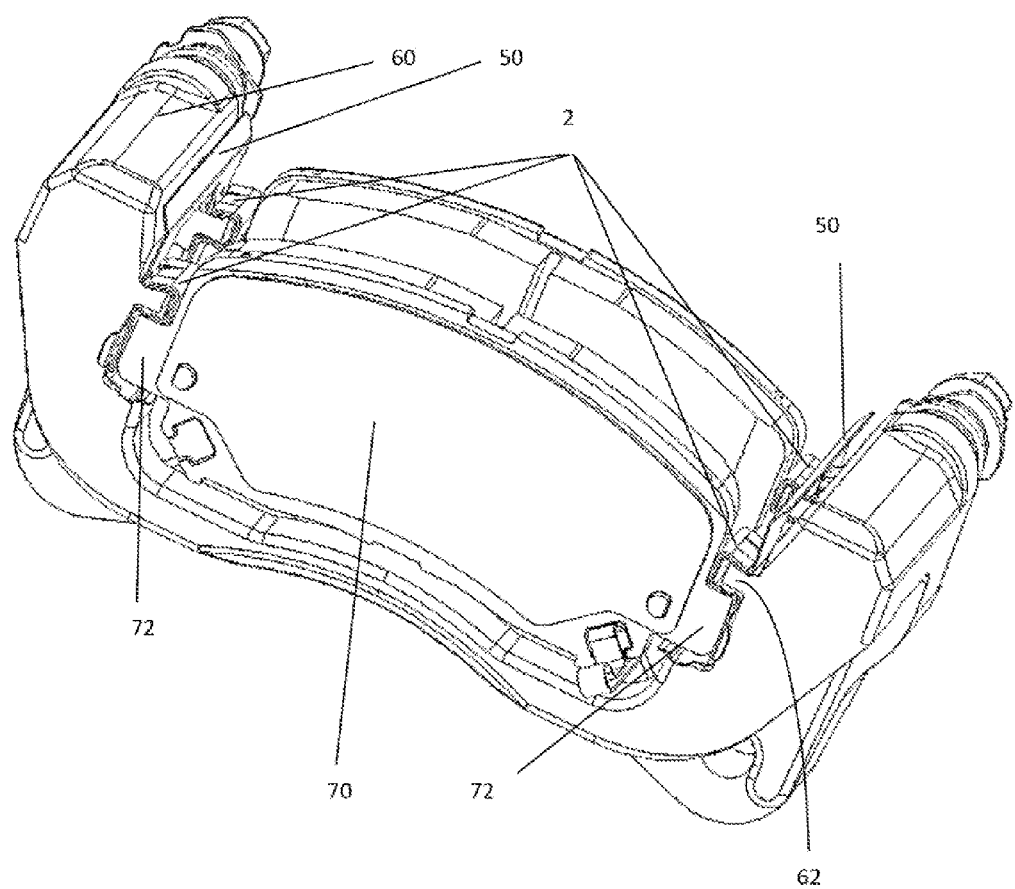
FIG. 13 illustrates a perspective view of a partial brake system of the teachings herein.

FIG. 13 illustrates a support bracket 60 including brake pads 70 having a pad ear 72 on each end. The pad ears 72 extend into a pad clip 50 including the dampening clips 2. The pad clips 50 are connected to an abutment 62 of the support bracket 60/

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A dampening clip comprising:
   a body portion and
   a connecting portion extending from the body portion, the connecting portion being configured to connect the dampening clip to an adjacent component, and
   wherein the dampening clip includes a portion made of a supporting material and a portion made of a dampening material,
   wherein the adjacent component is a pad clip that includes two or more arms that are generally parallel and generally symmetrical to each other, each of the two or more arms includes a lip on an outside of each arm and a locator on an inside of each arm, and
   wherein the connecting portion of the dampening clip extends at least partially around the lip of the pad clip to form a first connection, and in a rearward region the dampening clip includes a locking portion that extends at least partially around the locator.

2. The dampening clip of claim 1, wherein the connecting portion is generally "C" shaped.

3. The dampening clip of claim 1 wherein the rearward region and the locking portion are located on an opposite side of the body portion as the connecting portion.

4. The dampening clip of claim 1, wherein the locking portion is shaped so that the locking portion extends around one or both edges of a portion of the adjacent component.

5. The dampening clip of claim 1, wherein the supporting material is completely encased by the dampening material.

6. The dampening clip of claim 1, wherein a forward surface of the supporting material includes the dampening material and a rearward surface of the supporting material is free of dampening material or vice versa.

7. The dampening clip of claim 1, wherein the body portion is generally planar.

8. The dampening clip of claim 1, wherein the body portion, the connecting portion, or both substantially mirror the shape of the adjacent component.

9. The dampening clip of claim 1, wherein the supporting material is stainless steel and the dampening material is an elastomeric material.

10. The dampening clip of claim 1, wherein the supporting material is located in contact with the pad clip and the dampening material is free of contact with the pad clip.

11. A brake system comprising the dampening clip of claim 1, wherein the brake system includes a support bracket and two brake pads and the pad clip is located between the support bracket and the two brake pads on each end of the two brake pads, and
   wherein each of the dampening clips are located between the support bracket and the pad clip.

12. A brake system comprising;
a) a plurality of dampening clips, each of the dampening clips comprise:
   a body portion and
   a connecting portion extending from the body portion, the connecting portion configured to connect each of the dampening clips
   to an adjacent component,
   wherein each of the dampening clips include a portion made of a supporting material and a portion made of a dampening material,
   wherein the adjacent component is a pad clip that includes two or more arms that are generally parallel and generally symmetrical to each other, each of the two or more arms include an angled bracket having a bias tab, and
   wherein the connecting portion extends over a portion of the angled bracket and a locking tab of each of the dampening clips extends into the bias tab forming a fixed connection,
b) a support bracket and two brake pads,
   wherein the pad clips are located between the support bracket and the two brake pads on each end of the two brake pads, and
   wherein each of the dampening clips are located between the pad clip and an ear of the two brake pads.

13. A dampening clip comprising:
a body portion and
a connecting portion extending from the body portion, the connecting portion being configured to connect the dampening clip to an adjacent component,
   wherein the dampening clip includes a portion made of a supporting material and a portion made of a dampening material,
   wherein the adjacent component is a pad clip that includes two or more arms that are generally parallel and generally symmetrical to each other, each of the two or more arms includes an angled bracket having a bias tab,
   wherein the connecting portion of the dampening clip extends over a portion of the angled bracket and a locking tab of the dampening clip extends into the bias tab forming a fixed connection.

14. The dampening clip of claim 13, wherein the connection portion includes two or more fingers that assist in creating the connection with the adjacent component,
   wherein at least one of the two or more fingers is the locking tab that extends into the bias tab so that the dampening clip does not move relative to the adjacent component.

15. The dampening clip of claim 14, wherein the locking tab extends below the other fingers so that the locking tab forms a connection with the pad clip.

16. The dampening clip of claim 14, wherein the connection portion includes three fingers, one of which is the locking tab.

17. The dampening clip of claim 13, wherein the dampening material is located in contact with the pad clip and the supporting material is free of contact with the pad clip.

18. The dampening clip of claim 13, wherein the connecting portion is generally "C" shaped.

19. The dampening clip of claim 13, wherein the body portion, the connecting portion, or both substantially mirror the shape of the adjacent component.

* * * * *